Oct. 7, 1930.                D. J. GOODWILL                1,777,487
                            TRACTOR POWER LIFT
                            Filed Jan. 6, 1930
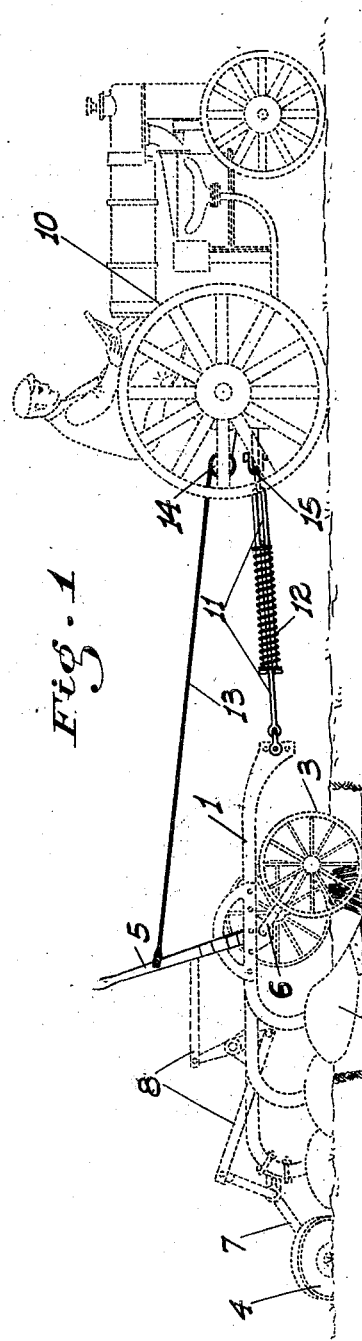
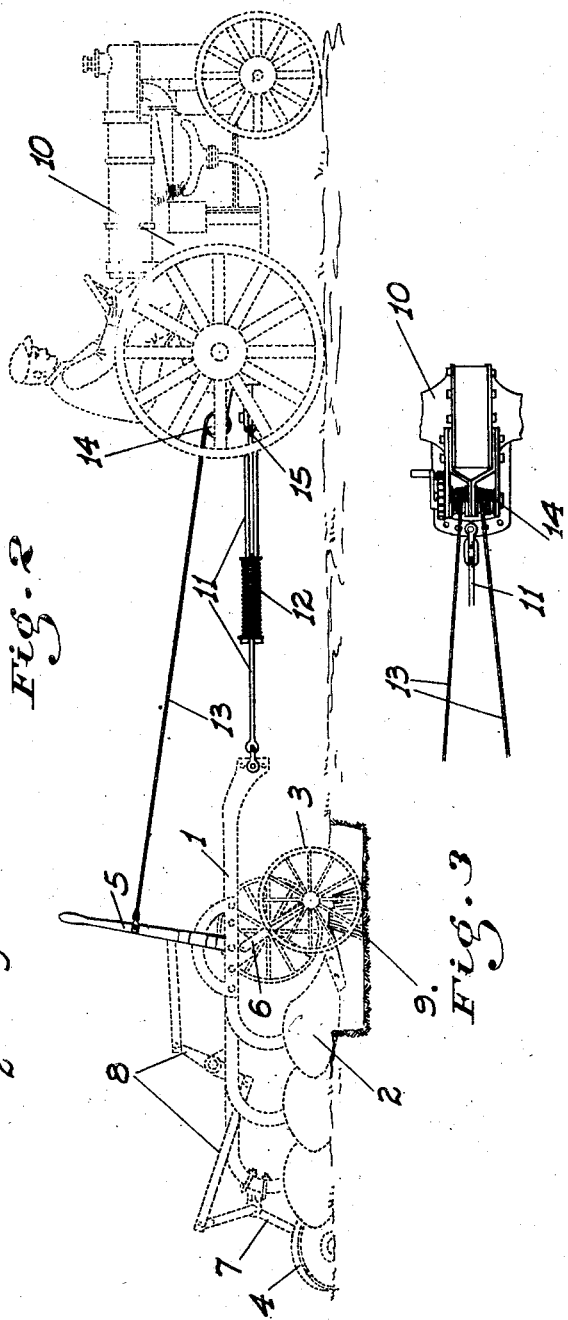
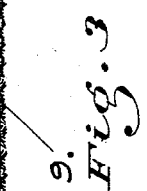
INVENTOR
*D. J. Goodwill*
BY
ATTORNEY Patented Oct. 7, 1930

1,777,487

UNITED STATES PATENT OFFICE

DEWEY J. GOODWILL, OF TURLOCK, CALIFORNIA

TRACTOR POWER LIFT

Application filed January 6, 1930. Serial No. 418,839.

This invention relates to wheeled plows or similar ground working implements, and particularly to a means for causing the plows or other ground engaging elements to be automatically raised from the ground when one or the other of said elements encounters a relatively unyielding obstruction below ground.

Certain plows are now equipped with various types of power lift devices, which are intended to function to the above end. From my experience however such devices are unsatisfactory for the purpose, as they depend for their operation on the power derived from the rotation of the wheels of the plow. If, however, such rotation is very slow or is halted, or if the wheel loses traction and slips (as it is apt to do when the above conditions are encountered) the lifting mechanism will of course not function.

It is therefore the main object of my invention to provide a power lift mechanism which is controlled by the forward movement of the tractor and not of the implement itself, and which positively functions when and only when the normal drag or resistance of the implement is considerably increased, as by the engagement of one of the ground engaging elements with an underground obstruction.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings, similar characters of reference indicate corresponding parts in the several views:

Fig. 1 is a side elevation of a standard type of plow and tractor equipped with my improved power lift device, the parts of said device and implement being shown in their normal operating positions.

Fig. 2 is a similar view showing the action of the lift device when one of the plow elements encounters an obstruction.

Fig. 3 is a fragmentary top plan view showing the connection of the plow-lever cables with the tractor, and their relation to the drawbar clevis of the tractor.

Referring now more particularly to the characters of reference on the drawings, the numeral A denotes in general a ground working implement of standard character having a main frame 1, plows or similar engaging elements or tools 2, a land wheel 3, and a furrow wheel 4. The depth at which the tools work is controlled by adjusting the height of said wheels relative to the frame, and such height is in turn controlled by one or more levers 5. The form of connection between the lever and the wheels differs in various makes of plow. In the present instance I have shown, for the purposes of illustration only, the land wheel as being mounted on the lower end of a downwardly and forwardly angled arm 6 which is pivoted at its upper end on the frame 1; the lever being fixed with the pivot arm. When the lever is pulled forwardly the arm is turned down, as will be evident, and the spacing between the wheel and the frame is increased, causing the plow elements to be accordingly raised. The furrow wheel is shown as being similarly operated, in conjunction with the operation of the wheel 3, by a suitable lever and linkage connection between the wheel supporting arm 7 and the lever 5, as indicated at 8.

The above parts or their equivalent in one form or another may be considered as standard construction. The lever 5 is manipulated to thus cause the frame and plow elements attached thereto to be raised when said elements encounter an underground obstruction 9, by the following means:

The tractor 10, used to pull the implement, is connected thereto by a drawbar 11, which of whatever special form it may be, has as an essential feature a heavy spring 12 forming a part thereof. This spring whether arranged to be under tension or compression is sufficiently strong to take the normal drag or load of the implement without giving to any appreciable extent. When, however, this drag becomes excessive as one of the elements 2 strikes the obstruction 9 or extra hard ground, the spring gives, the drawbar is lengthened, and the spacing between the tractor and the implement is of course increased. This increase in spacing is utilized to operate the lever 5 to the aforementioned extent, and by a non-elastic connection such as a cable 13 which is attached at one end to the lever and at its other end to the tractor. The cable is normally taut when the drawbar is in its normal or unstretched position. To enable the cable to be always maintained taut under normal conditions, regardless of the initial setting of the lever which controls the depth at which the plow elements will operate, the tractor end of the cable is wound about and secured to a hand controlled drum 14 mounted on the tractor and normally prevented from rotating in a cable unwinding direction by suitable means of ordinary character. This drum is preferably positioned in vertical alinement with the drawbar clevis 15 of the tractor and the cable is connected to said drum adjacent the transverse plane of said clevis. This enables the tractor to turn relative to the implement without any strain being placed on the cable such as would cause the lever to be pulled forwardly.

Though I have only shown one implement as being attached to the tractor, as many such implements may be thus connected as may be desired or practicable. In such case the control cables to the levers of the different implements would all converge to the drum in the transverse plane of the drawbar clevis, as indicated in Fig. 3, so as to prevent any of these cables being pulled when the tractor turns relative to the implements, for the reasons stated above.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A power lift device for tractor-hauled ground working implements having a forwardly movable lever, and means operatively connected to the lever so as to cause the frame of the implement, and the ground engaging elements carried thereby, to be raised with such movement of the lever; said device comprising a non-elastic member adapted to extend between and be connected to the lever and the tractor, and a drawbar adapted for connection to the implement and tractor; said drawbar including a spring member arranged to cause the drawbar to be lengthened only when the pull thereon exceeds a predetermined load.

2. A device as in claim 1, in which takeup means is provided for one end of said non-elastic member to enable the same to be maintained taut regardless of the normal initial setting of the lever.

3. A device as in claim 1 in which a hand controlled drum to which one end of the non-elastic member is connected, is provided, with means for mounting said drum onto the tractor in vertical and transverse alinement with the drawbar clevis of the tractor.

In testimony whereof I affix my signature.

DEWEY J. GOODWILL.